Dec. 7, 1954   F. G. SCHWEISTHAL ET AL   2,696,277
LUBRICATOR FOR CONVEYERS
Filed May 22, 1951   7 Sheets-Sheet 1
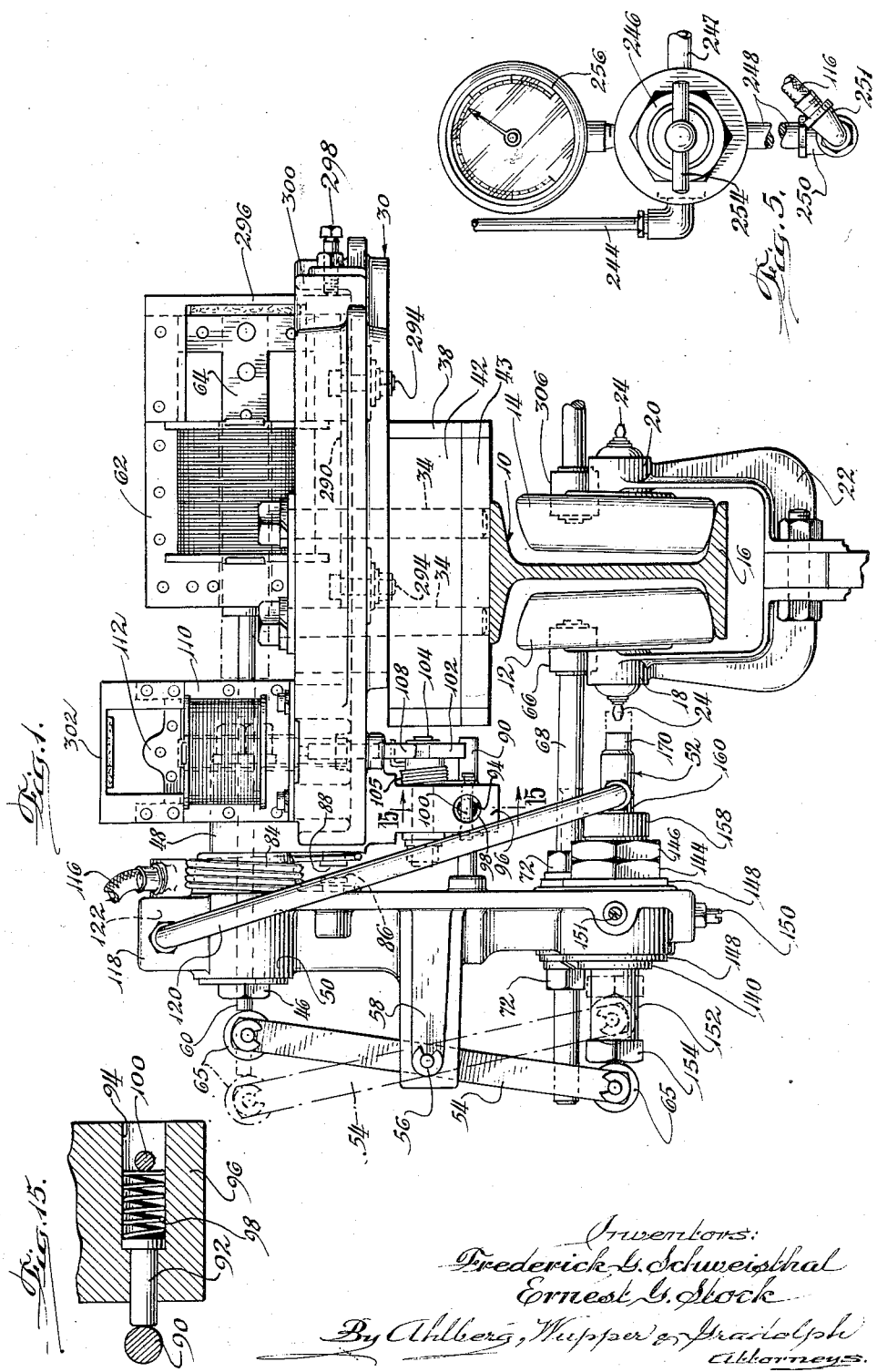
Inventors:
Frederick G. Schweisthal
Ernest G. Stock
By Ahlberg, Hupper & Frandolph
Attorneys.

Dec. 7, 1954  F. G. SCHWEISTHAL ET AL  2,696,277
LUBRICATOR FOR CONVEYERS
Filed May 22, 1951  7 Sheets-Sheet 2
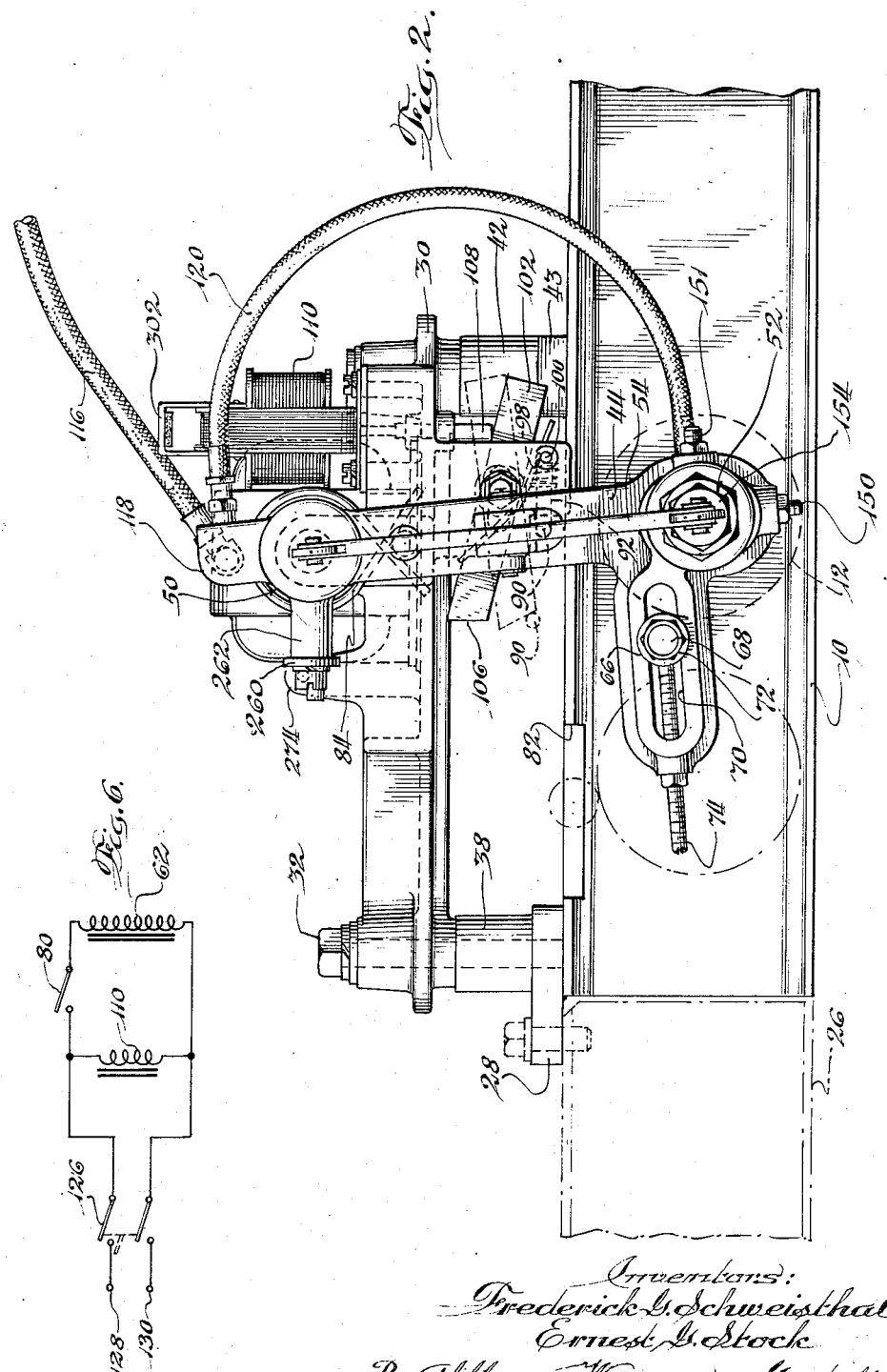
Inventors:
Frederick G. Schweisthal
Ernest J. Stock
By Ahlberg, Wupper & Gradolph
Attorneys.

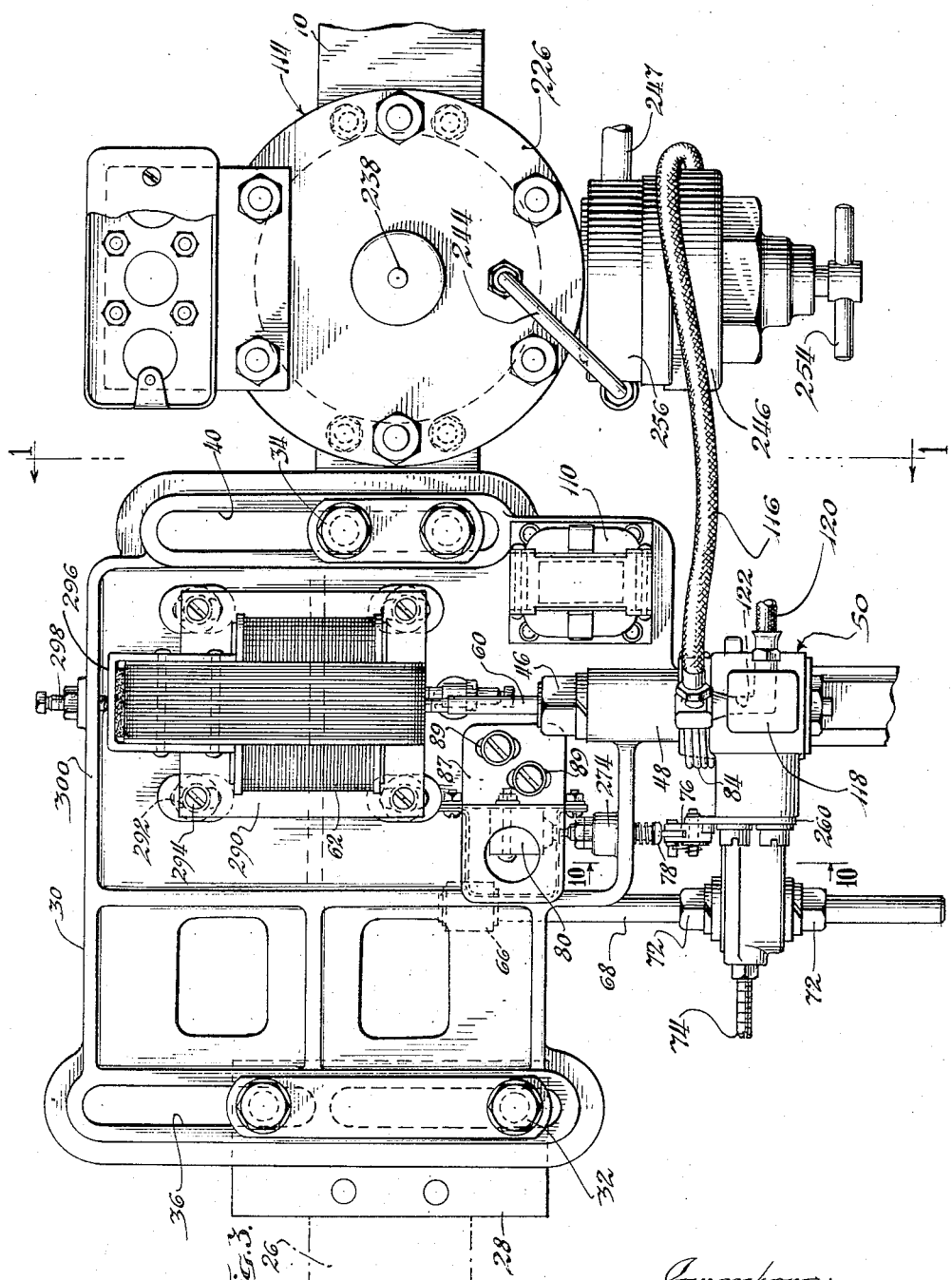

Dec. 7, 1954   F. G. SCHWEISTHAL ET AL   2,696,277
LUBRICATOR FOR CONVEYERS
Filed May 22, 1951   7 Sheets-Sheet 4
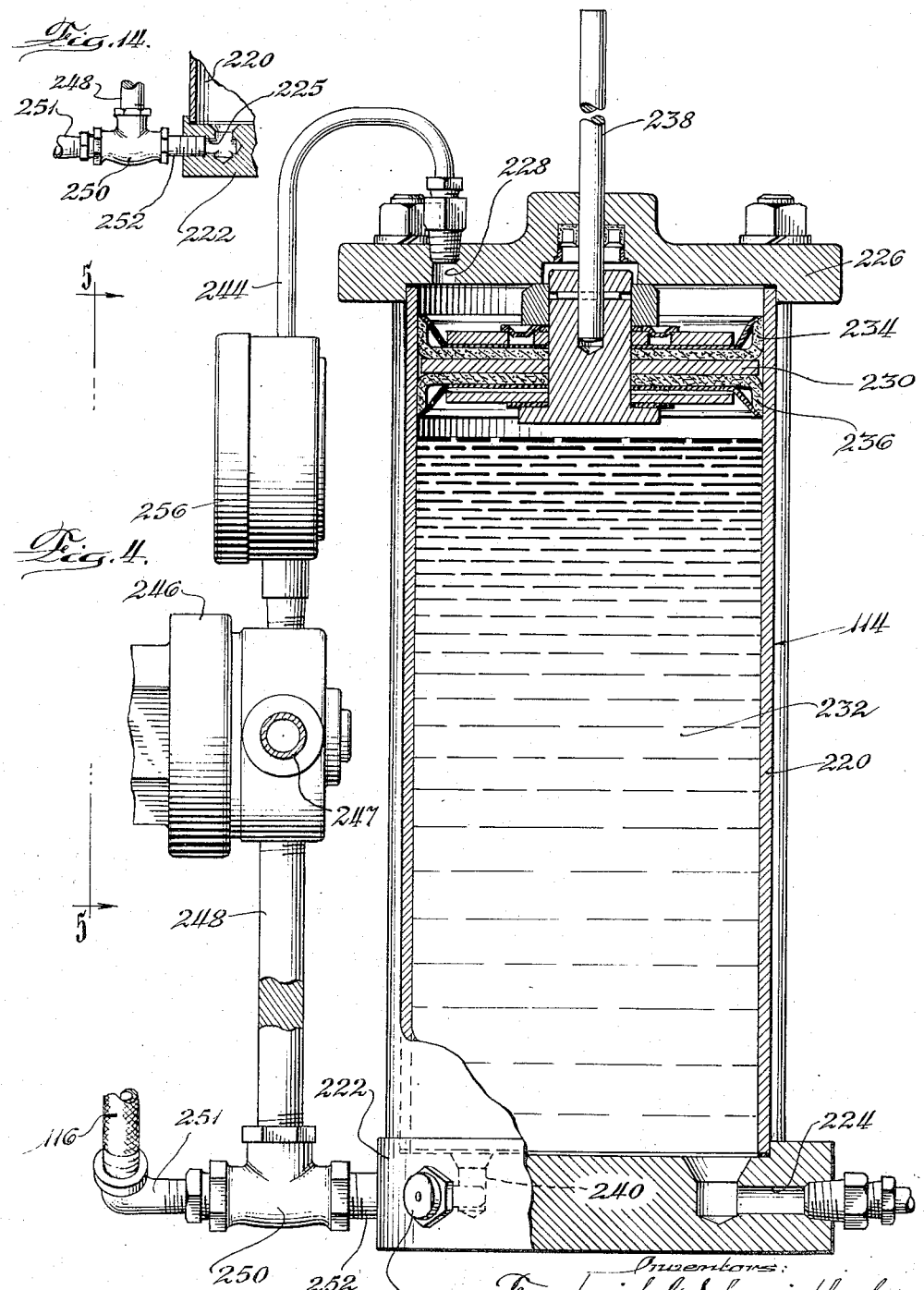

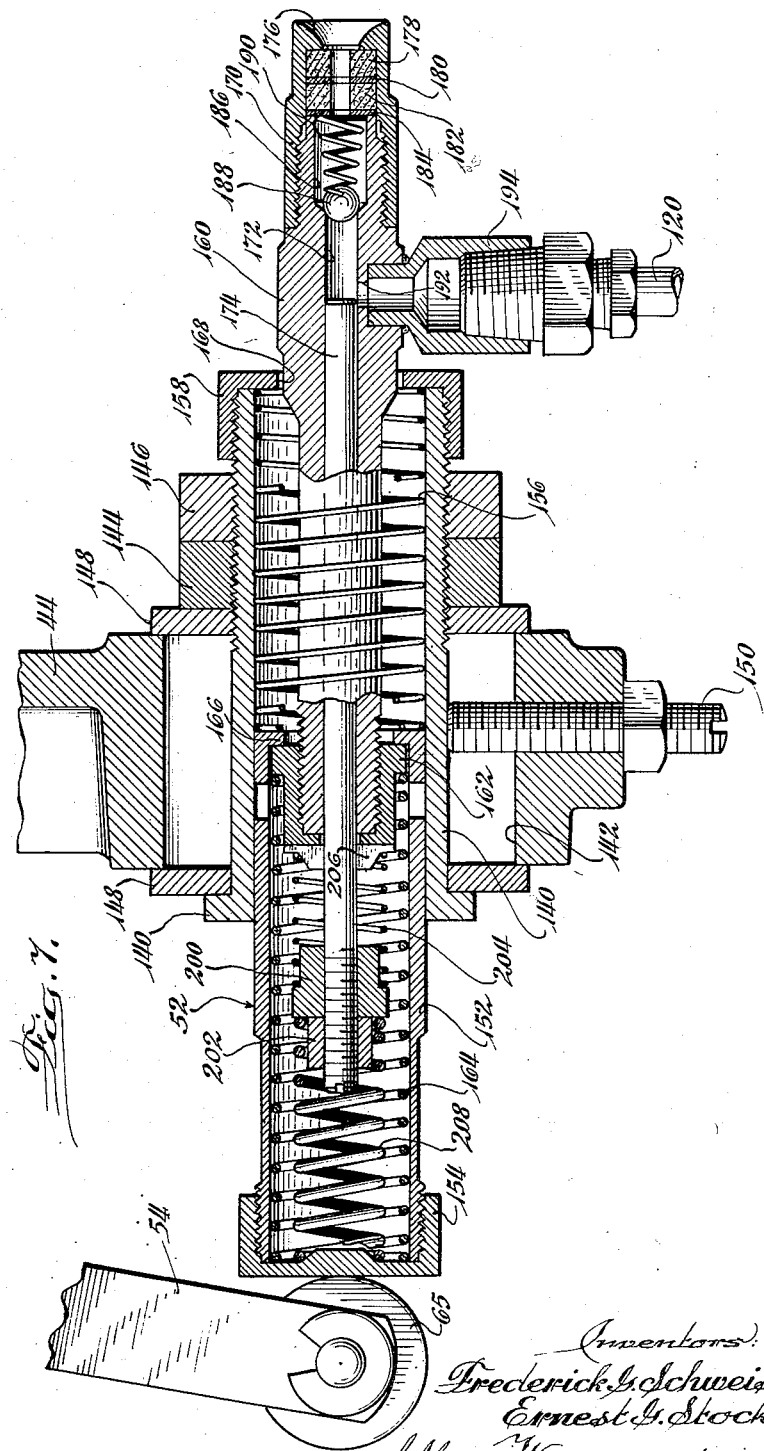

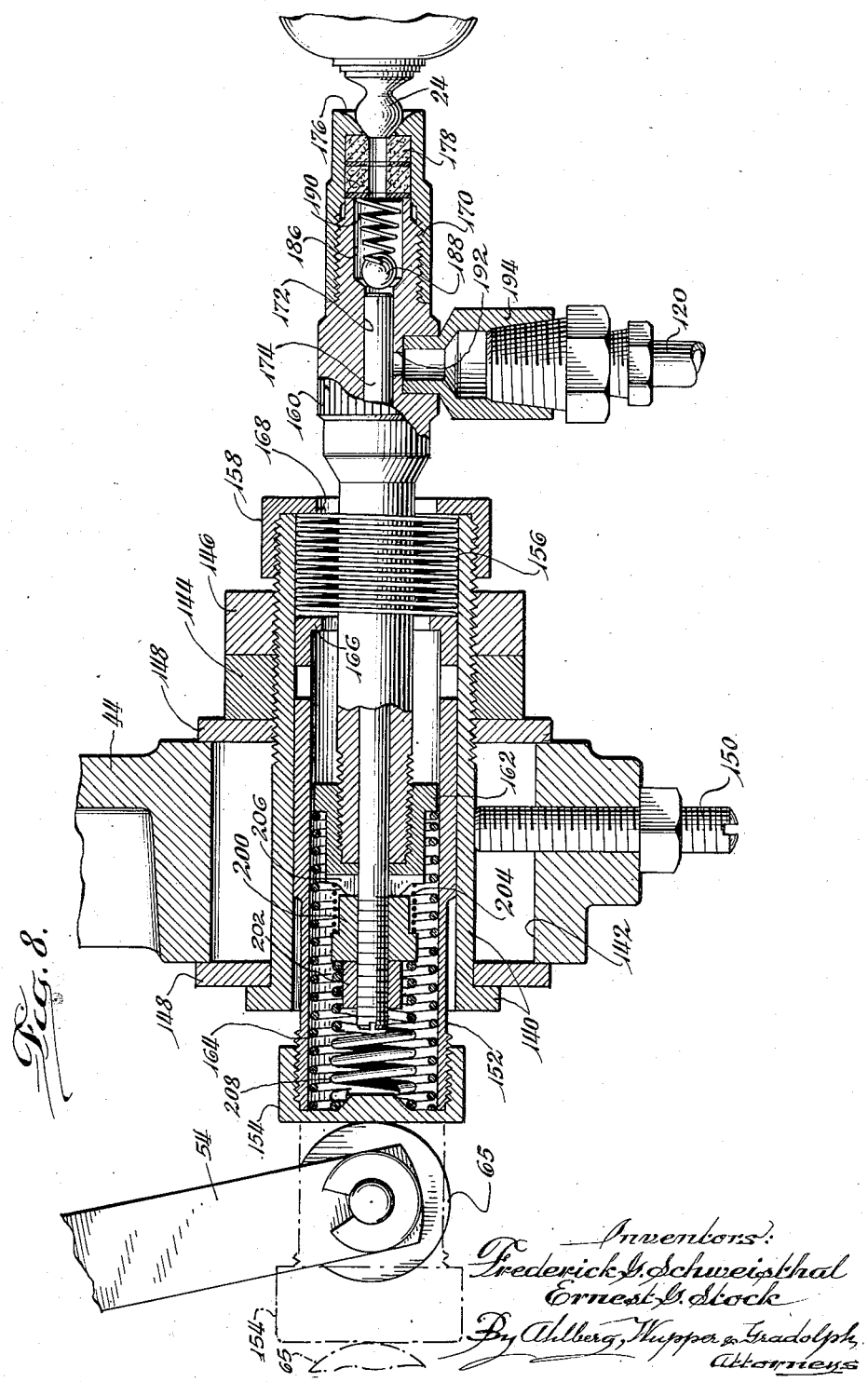

Dec. 7, 1954  F. G. SCHWEISTHAL ET AL  2,696,277
LUBRICATOR FOR CONVEYERS
Filed May 22, 1951  7 Sheets-Sheet 7

Inventors:
Frederick G. Schweisthal
Ernest G. Stock
By Allberg, Wupper & Gradolph
Attorneys.

2,696,277
Patented Dec. 7, 1954

United States Patent Office

2,696,277

LUBRICATOR FOR CONVEYERS

Frederick G. Schweisthal, Skokie, and Ernest G. Stock, Chicago, Ill., assignors to Stewart-Warner Corporation, Chicago, Ill., a corporation of Virginia Application May 22, 1951, Serial No. 227,658

21 Claims. (Cl. 184—15)

This invention relates to an automatic machine for lubricating overhead trolley conveyors and similar devices.

Overhead trolley conveyors have come into widespread use for carrying materials of various sorts from place to place in factories. An overhead conveyor consists of containers and hooks of various kinds suspended from carriages having wheels running on an endless track. The track usually consists of an overhead I-beam, and the wheels of the carriages run on the lower flange of the I-beam. The carriages are joined together by means of an endless chain and all of the carriages are moved together by supplying motive power to the chain through sprockets or other devices.

All of the wheels on these overhead conveyors must be lubricated periodically. Such lubrication presents serious problems since a conveyor may have several hundred wheels. The lubricating must usually be done when the conveyor is in operation, in order to avoid losing production time. Lubricating the wheels by hand is difficult because the conveyor may run at a speed of 100 feet per minute or more and the wheels may be spaced one foot apart or less.

An object of this invention is to provide an entirely automatic machine for delivering individual measured charges of lubricant at a high pressure to all of the wheels of a trolley conveyor.

A further object is to provide such a machine that can lubricate the conveyor without interfering with its normal operation.

A further object is to provide a trolley conveyor lubricator which is adjustable to accommodate various sizes of trolley wheels and trolley tracks and various locations of the lubricating fittings on the wheels.

A further object is to provide a conveyor lubricator which can be depended upon absolutely to lubricate all of the wheel bearings of a conveyor in rapid succession during normal operation of the conveyor.

A further object is to provide a conveyor lubricator which is entirely self-contained and which is operable from readily available sources of power.

A further object is to provide a conveyor lubricator which can be manufactured readily and which is economical.

A further object is to provide an automatic trolley conveyor lubricator which is extremely rugged to stand hard service and which involves a minimum of complication.

Further objects, advantages and features of the invention will become apparent from the following illustrative description taken with the drawings, in which:

Fig. 1 is an elevational sectional view of a lubricator constructed in accordance with the invention, the view being taken transversely to the track of the conveyor as indicated by the line 1—1 in Fig. 3;

Fig. 2 is an elevational view of the lubricator taken broadside to the track and at right angles to Fig. 1;

Fig. 3 is a top plan view of the lubricator;

Fig. 4 is a central elevational sectional view of a lubricant pressure reservoir forming a part of the lubricator;

Fig. 5 is a fragmentary elevational view taken as indicated by the line 5—5 in Fig. 4, the view being drawn on a smaller scale than Fig. 4;

Fig. 6 is a circuit diagram illustrating the electrical connections of the lubricator;

Fig. 7 is an enlarged fragmentary sectional view of a lubricant gun forming a part of the lubricator;

Fig. 8 is a view similar to Fig. 7 showing a change of position of the parts of the lubricant gun;

Fig. 14 is a fragmentary sectional view showing a detail of the lubricant source; and Fig. 15 is an enlarged fragmentary sectional view, taken as indicated by the line 15—15 in Fig. 1, of a resilient backstop arrangement.

Figure 9:
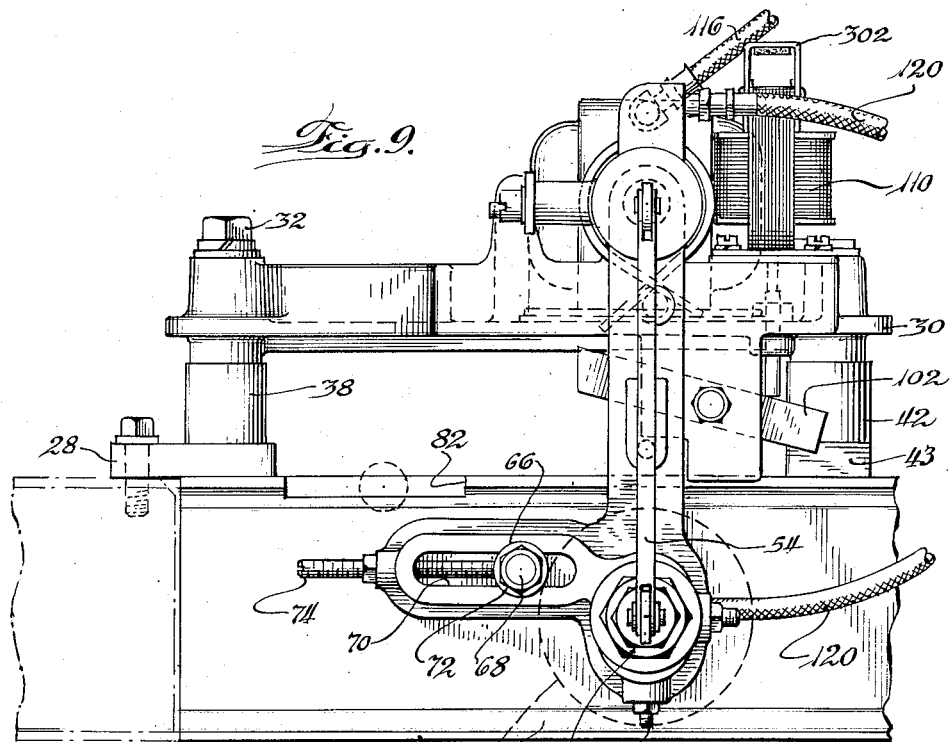
Fig. 9 is a fragmentary elevational view similar to Fig. 2 showing a change in the positions of some of the parts of the lubricator.

In Fig. 1 an I-beam 10 serves as a track for a pair of conveyor wheels 12 and 14 which roll on the left and right-hand portions of the lower flange 16 of the I-beam respectively. The wheels are rotatably carried in bearings 18 and 20 joined by a yoke 22 which embraces the lower flange of the I-beam. Containers, hooks and the like, not shown, may be suspended by means of the yoke.

The bearings 18 and 20 are provided with fittings 24 for receiving lubricant under pressure. The fittings are shown as being located on the axes of the wheels, but in some types of conveyors they may be offset from the axes.

The section of I-beam 10 which is shown forms a part of the lubricator. It is inserted in the endless trolley track of the conveyor in place of a length of the ordinary track. This is indicated in Fig. 2 which shows a portion 26 of the ordinary track to which the I-beam section 10 is joined by means of a plate 28 bolted to the upper flange of the section 26. The plate 28 is welded to the I-beam section 10. The lubricator is supported on a flat frame casting 30 which is secured to the I-beam section 10 by means of four bolts 32 and 34. The bolts 32 extend through transverse slots 36 in the casting 30 (Fig. 3), and also through an apertured spacer bar 38 (Fig. 2), and are threaded into the plate 28. The bolts 34 extend through a transverse slot 40 (Fig. 3) in the frame 30 and through a spacer bar 42 (Fig. 2). The bolts 34 are threaded into a bar 43 welded to the upper flange of the I-beam. The slots 36 and 40 permit adjustment of the position of the frame 30 transversely with respect to the I-beam.

A depending arm 44 is carried on pivot means 46 mounted in a sleeve 48 formed integrally with the frame 30. The pivot means 46 extends at right angles to the I-beam so that the arm is rockable in a plane parallel to the I-beam. The outer end portion of the pivot means 46 is housed within a hub 50 on the arm.

The lower end of the arm 44 carries a lubricant gun 52 which is directed inwardly at right angles to the I-beam. The arm provides one particularly advantageous means to support the gun for movement in general alignment with a portion of the path of the wheels.

The lubricant gun is operated by means of a rocker arm 54 mounted on a pivot 56 carried by a post 58 extending outwardly on the arm 44 at right angles to the I-beam. The pivot 56 is positioned along the arm 44 approximately midway between the gun 52 and the pivot means 46. The pivot 56 is arranged to provide for rocking of the rocker arm 54 in a plane at right angles to the plane of rotation of the arm 44.

The rocker arm 54 is operated by means of a thrust transmitting plunger 60 extending through the pivot means 46 which supports the arm 44. The plunger 60 is pushed outwardly to operate the gun 52 by means of power operated means which may include a solenoid 62 having a movable plunger or armature 64. The rocker arm has rollers 65 at its ends for engaging the plunger and the gun.

Operation of the lubricator is synchronized with respect to movement of the trolley wheel 12 by means of a wheel follower in the form of a roller 66 upon which the wheel 12 impinges as it traverses the I-beam 10. The roller 66 is supported by a threaded rod 68 clamped in a slot 70 on the arm 44 by means of nuts 72. The slot 70 extends generally at right angles to the rocker arm 54. The slot 70 permits adjustment of the spacing between the roller 66 and the gun 52. A threaded stop rod 74 extending into one end of the slot 70 is provided to facilitate adjusting the position of the roller 66. The wheel follower 66 provides one particularly advantageous means for moving the gun forward along with the wheels when one of the wheels comes into general alignment with the gun.

When the wheel 12 engages the roller 66 the movement of the wheel rotates the arm 44 forwardly in a clockwise direction as seen in Fig. 2. After a predetermined rotation of the arm 44 a dog or pawl 76 mounted on the arm 44 pushes a switch operating plunger 78 inwardly and thereby closes a sensitive switch 80 to energize the solenoid 62. Further predetermined movement of the arm disengages the dog from the switch operating plunger and thereby terminates lubrication of the wheel bearing. The solenoid 62 provides one particularly advantageous power operated means to operate the lubricating gun 52. The arrangement including the switch 80, the plunger 78 and the pawl 76 provides one particularly advantageous means for controlling the power operated means to operate the gun 52 during the forward movement of the gun.

The upper flange of the I-beam has a notch 82 to permit the roller 66 to ride up over the wheel 12 and thereby to become disengaged from the wheel.

After the roller 66 is disengaged from the wheel 12, the arm 44 swings back to its original position shown in Fig. 2, partly by virtue of gravity and partly under the impetus of a torsional coil spring 84 having its ends hooked on headed pins 86 and 88 on the arm and the frame respectively, the spring 84 being coiled around a portion of the hub 50.

The switch 80 is secured to a mounting bracket 87 bolted to the frame 30. Mounting slots 89 in the bracket provide an adjustment of the position of the switch with respect to the plunger 78.

The depending arm 44 carries a pin 90 which extends inwardly toward the I-beam 10 underneath the frame 30. The return spring 84 urges the pin 90 against a yieldable backstop including a plunger 92 carried in an opening 94 in a downwardly extending lug 96 on the frame 30. The stopping plunger is retained in the bore 94 by means of a coiled compression spring 98 compressed between the plunger and a transverse pin 100. (See Fig. 15.)

A latching arrangement is provided to arrest the gun just as it begins its return movement after reaching its highest position. Latching occurs when the lubricator is taken out of service. The latching avoids unnecessary wear on the lubricator and unnecessary operation of the power controlling switch 80. The latching arrangement may advantageously include a rockable latching bar 102 carried on a pivot 104 supported by the lug 96. A coiled torsional spring 105 urges the latching bar counterclockwise toward the dotted line position shown in Fig. 2. One end of the torsional spring 105 is hooked over the latching rocker 102 and the other end is hooked over one end of the pin 100.

As shown in Fig. 2, the latching rocker has a sloping left-hand end 106 which is in the path of the pin 90 when the latching rocker is in its dotted line position. When the latch 102 is in its dotted line position, the pin 90 comes to rest against the end of the latch, after the roller 66 passes over one of the trolley wheels 12, instead of returning to its normal position against the yieldable stopping plunger 92. Succeeding wheels on the conveyor merely slide over the roller 66 wtihout raising the arm 44 substantially and without operating the lubricating gun 52.

A vertical plunger 108 is movable downwardly against the right-hand arm of the latching rocker 102 to move the sloping end 106 of the latch out of the path of the pin 90. During normal operation of the lubricator the plunger is pushed downwardly to release the depending arm 44 by means of power operated means which may advantageously include a solenoid 110 having a movable plunger or armature 112.

Lubricant is supplied under pressure to the lubricating gun 52 by means of a source 114 of lubricant, shown in Fig. 3. A hose 116 extends from the source 114 to a connecting block 118 on the hub 50 and a second length of hose 120 extends from the connecting block 118 to the gun 52. As shown in Fig. 1, the hoses 116 and 120 are connected by means of a passageway 122 in the connecting block 118.

As shown in Fig. 6, a line switch 126 is provided to connect the solenoid 110 across power line terminals 128 and 130. Closure of both the line switch 126 and the sensitive control switch 80 is required in order to connect the solenoid 62 across the line terminals.

The detailed construction of the lubricating gun 52 is illustrated particularly in Fig. 7. The gun includes a headed bushing 140 which is clamped in an oversize opening 142 in the lower end of the arm 44 by means of a nut 144 and a lock nut 146 threaded on the bushing. Washers 148 are provided on each side of the arm 44 around the bushing.

The oversize opening 142 at the end of the arm 44 provides an adjustment of the distance between the gun 52 and the pivot means 46 in order to accommodate differently dimensioned conveyors. A rod 150 is threaded into the lower end of the slot to facilitate this adjustment and act as a stop. The oversize hole also permits lateral adjustment of the gun with respect to the arm 44. A rod 151 threaded into one side of the opening facilitates this adjustment. Washers 148 are provided on each side of the arm 44.

A sleeve 152 is reciprocable inside the bushing 140. A cap 154 threaded over the rear end of the sleeve 152 is engageable with the roller 65 at the lower end of the rocker arm 54. A coiled spring 156 is compressed between the front end of the sleeve and a shoulder provided by a cap 158 threaded over the front end of the bushing 140. The spring urges the sleeve rearwardly against the roller 65.

A nozzle carrying cylindrical member 160 extends through the bushing 140 into the sleeve 152. The nozzle carrying member is threaded into a collar 162 which is reciprocable in the sleeve. The collar provides an external shoulder on the member.

A coil spring 164 is compressed between the shoulder provided by the cap 154 closing the rear end of the sleeve 152 and the collar 162 to urge the collar and the nozzle carrying member 160 forwardly. The collar is retained in the sleeve by means of an inwardly extending shoulder or flange 166 at the forward end of the sleeve.

A front portion of the nozzle carrying member 160 extends out of the sleeve through an aperture 168 in the cap 158 closing the front end of the bushing 140. A nozzle 170 is threaded onto the front end of the nozzle carrying member.

The nozzle carrying member has an axial bore 172 which forms a piston cylinder for a piston 174. The nozzle 170 has an outwardly flaring bell mouth 176 for engaging lubricating fittings. A soft resilient washer 178 is positioned at the neck of the mouth of the nozzle to form a seal with lubricating fittings. The resilient washer 178 has a metallic backing washer 180. A second such assembly of a soft resilient washer 182 and a metallic backing washer 184 is positioned in the nozzle just to the rear of the first assembly.

The front end of the nozzle carrying member 160 has an enlarged axial bore 186 to accommodate a check valve ball 188 which is pressed rearwardly by a helical spring 190 to close the front end of the axial piston cylinder bore 172.

The hose 120 communicates with the axial piston cylinder bore 172 through a radial passage 192 spaced rearwardly along the bore 172 from the check valve ball 188. A bushing 194 is provided to connect the hose with the radial passage 192 in the nozzle carrying member 160.

The piston 174, in the form of a long rod, is reciprocable in the piston cylinder bore 172. The piston rod 174 extends rearwardly out of the nozzle carrying member 160 and through the collar 162. A spring carrier 200 and a locknut 202 are threaded on the rear end of the piston rod. A helical spring 204 is compressed between the spring carrier and a conical kerfed spring centering extension 206 on the collar 162. A heavy helical spring 208 is compressed between the spring carrier 200 and the cap 154 which closes the rear end of the sleeve 152.

The detailed construction of the source 114 of lubricant is shown particularly in Fig. 4. The source comprises a cylindrical tank 220 having a base 222 providing two lubricant outlets 224 and 225 (Fig. 14). The tank has a cover 226 providing an inlet 228 for compressed air. A piston or follower 230 is reciprocable in the cylindrical tank. The portion of the tank below the piston is filled with lubricant 232 and the portion of the tank above the piston provides an air space. Leakage around the piston is prevented by leather packing cups 234 and 236, one of which faces toward the air space and the other toward the lubricant.

A piston rod 238 extends from the piston 230 through a packed opening in the cover 226 to indicate the quantity of lubricant remaining in the tank 220. The portion of the tank below the piston is filled with lubricant through an opening 240 in the base 222 terminating in a button head lubricating fitting 242.

The air inlet opening 228 in the cover 226 of the lubricant tank is connected through a conduit 244 to the outlet of a pressure regulating valve 246, as best shown in Fig. 5. The inlet 247 of the pressure regulating valve is connected with an air line, not shown. A solid rod 248, which supports the pressure regulating valve is threaded into a T fitting 250. The T fitting and a nipple 252 connect the outlet 225 with a lubricant outlet elbow 251. The pressure regulating valve is provided with a handle 254 for adjusting the outlet pressure and a pressure gauge 256 for indicating the pressure.

The switch operating dog 76 is supported on a mounting plate 260 which is bolted to a pillar 262 formed integrally with the hub 50 on the arm 44. The pillar 262 extends generally at right angles to the plane of the rocker arm 54.

Figures 10, 11, 12, 13:
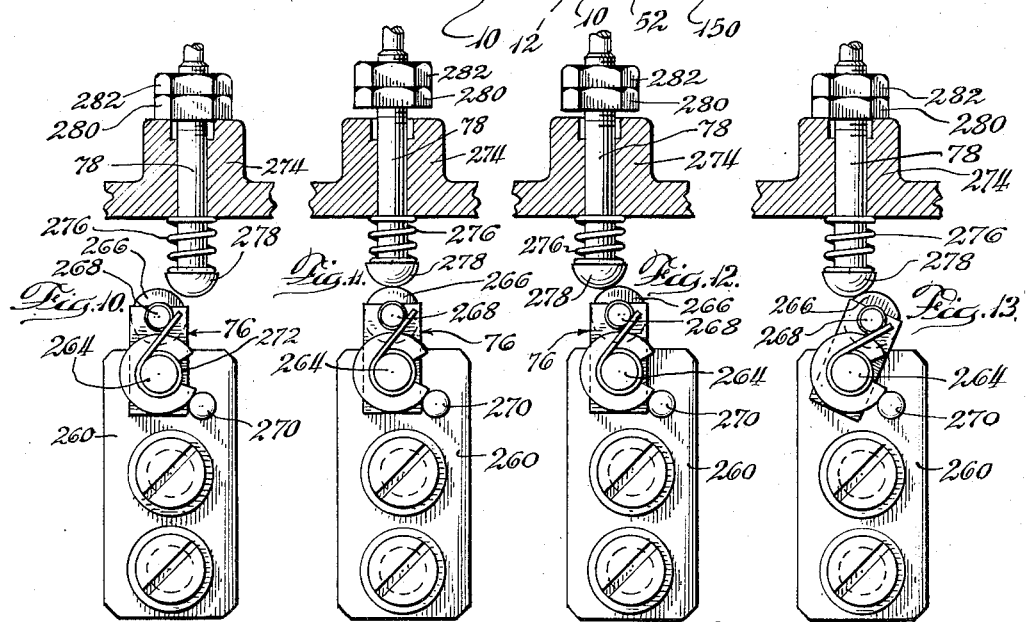
Figs. 10 through 13 are enlarged fragmentary views taken as indicated by the line 10—10 on Fig. 3 illustrating a switch operating arrangement in various stages of operation.

As shown in Fig. 10 the dog 76 is in the form of a rectangular bar or pawl which is mounted by means of a pivot 264 on the mounting plate 260. A roller 266 is mounted on the outer end of the dog by means of a pivot 268. The dog is urged counterclockwise against a stop pin 270 on the mounting plate by means of a coiled torsional spring 272 wound around the pivot 264 and having one end anchored therein. The other end of the spring acts against the roller pivot.

The switch operating plunger 78 is reciprocable in a bearing sleeve 274 formed integrally with the frame casting 30. The plunger is urged outwardly into the path of the switch operating dog 76 by means of a spring 276 coiled around the plunger between the sleeve on the frame and a rounded head 278 on the plunger. The distance that the plunger extends into the path of the dog is adjustable by means of a nut 280 and a lock nut 282 threaded over the plunger behind the sleeve.

The sensitive switch 80 may be any one of the several commercial types which are operable from open to closed position with an extremely short movement of an operating plunger.

The solenoid 62 for operating the lubricating gun has a mounting plate 290 which is mounted in slots 292 in the frame casting 30 by means of bolts 294. The solenoid is provided with a saddle stop 296 which determines the extent of return movement of the solenoid armature 64. The slots for mounting the solenoid provide an adjustment of the initial or retracted position of the nozzle 170 of the lubricating gun 52. A bolt 298 threaded through a flange 300 on the frame positioned at the rear of the solenoid provides an adjustable stop to facilitate accurate positioning of the solenoid.

The latch operating solenoid 110 has a saddle stop 302 limiting the upward travel of the armature 112.

In the operation of the lubricator the line switch 126 (Fig. 6) is closed to energize the latch-releasing solenoid 110 and the circuit for operating the solenoid 62 which operates the lubricating gun 52. The latch operating solenoid 110 pushes the plunger 108 downwardly to lift the front end 106 of the latch 102 out of the path of the pin 90 on the arm 44. The arm then returns to the position shown in Fig. 2 in which the pin engages the spring pressed plunger 92.

In the initial position of the arm 44 as shown in Fig. 2, the switch operating plunger 78 is fully extended and the plunger operating dog 76 is positioned a short distance below the plunger as indicated in Fig. 10. The next conveyor wheel 12 rolling along the I-beam section 10 engages the roller 66 and carries the arm 44 forward or clockwise as seen in Fig. 2. The dog 76 on the arm moves upward to depress the plunger 78 and thereby to close the switch 80. The switch operating plunger 78 is shown in its fully depressed position in Fig. 11. Closure of the switch 80 energizes the solenoid 62 from the power line terminals 128 and 130 (Fig. 6).

The arm 44 continues to swing forward as the wheel 12 moves forward along the I-beam section 10. The dog 76 is moved upward to release the switch operating plunger 78 as shown in Fig. 12. Eventually the wheel 12 pushes the roller 66 upwardly into the slot 82 as indicated by the dotted line position of the roller in Fig. 2. The wheel 12 then passes under the roller 66 and thereby releases the arm 44. The torsional spring 84 thereupon returns the arm 44 to its initial position shown in Fig. 2. The spring pressed plunger 92 provides a resilient stop to cushion the stopping of the arm 44 at the end of its return swing.

During the return swing of the arm the dog 76 ratchets over the head 278 of the switch operating plunger 78 as indicated in Fig. 13. When the arm 44 returns to its initial position, the dog 76 snaps past the head of the plunger to its initial position as shown in Fig. 10.

The switch 80 is closed and the solenoid 62 is energized when the arm 44 is in a generally vertical position as shown in Fig. 9. In this position the lubricating gun 52 is approximately aligned with the lubricating fitting 24 on the bearing 18.

Energization of the solenoid 62 moves the armature 64 and the plunger 60 leftward as seen in Fig. 1, and thereby rocks the rocker arm 54 counterclockwise to its dotted line position shown in Fig. 1.

Movement of the rocker arm 54 forces the sleeve 152 to the right as seen in Fig. 8. The nozzle carrying member 160 is carried along with the sleeve 152 by the spring 164 until the bell-shaped mouth 176 of the nozzle engages the lubricating fitting 24. At this point further forward movement of the nozzle carrying member is arrested and the spring 164 is compressed during the remaining forward movement of the sleeve 152. The forward movement of the sleeve also compresses the sleeve return spring 156. The spring 164 is strong enough to maintain proper contact between the nozzle mouth and the fitting.

When the forward movement of the nozzle carrying member 160 is arrested, the piston rod 174 is moved forward in the piston cylinder bore 172 by means of the strong helical spring 208 positioned between the cap 154 and the spring carrier 200. The spring 208 moves the piston rod 174 until the spring carrier 200 abuts against the spring centering extension 206. During the remaining forward movement of the sleeve 152 the spring 208 is compressed without further movement of the piston rod 174. Movement of the piston rod 174 compresses the light piston rod return spring 204. The springs 164 and 208 are never compressed to their solid lengths. Thus, the contact between the nozzle mouth 176 and fittings 24 is established and maintained by spring pressure only.

During the forward movement of the piston rod 174, the piston rod first covers the inlet port 192. Then the piston rod ejects the charge of lubricant in the axial bore 172 in front of the piston rod. During ejection of the charge, the check valve ball 188 is unseated, and the charge is ejected through the bore 186 and the nozzle 170. The soft resilient washer 178 engages the lubricating fitting 24 to prevent leakage of lubricant between the nozzle and the fitting.

During the operation of the lubricating gun 52, the wheel 12 moves along the track a short distance. The wheel 12 carries the roller 66 forward and thereby maintains the gun 52 in general alignment with the lubricating fitting. The arm 44 rotates through only a small angle during the operation of the lubricating gun 52, and so the end of the arm at which the gun is supported deviates only slightly from the straight line path of the lubricating fitting on the wheel. There is sufficient play between the nozzle carrying member 160 and the sleeve 152, and between the nozzle carrying member 160 and the aperture 168 in the cap 158 closing the front end of the bushing 140, to permit the nozzle 170 to remain in sealed engagement with the lubricating fitting 24 during the operation of the lubricating gun 52. Slight clearance is provided between the collar 162 and the inside of the sleeve 152 to permit angular deviation of the nozzle carrying member 160 from its normal axial position.

When the switch 80 is opened to disconnect the solenoid 62, the sleeve 152 is returned to its initial position as shown in Fig. 7 by expansion of the spring 156. The nozzle 170 is withdrawn from the lubricating fitting 24 when the flange 166 on the sleeve 152 carries the collar 162 rearwardly. The spring 164 realigns the member 160 with the axis of the gun by forcing the collar 162 against the flange 166. The return of the sleeve 152 releases the compression of the heavy spring 208 and thereby permits the spring 204 to return the piston rod 74 to its initial position. It should be noted that the springs 156, 164, and 204 have substantial initial compressive loading, but the heavy spring 208 is not substantially compressed in its initial position shown in Fig. 7. The spring 208 is considerably stronger than the spring 164, and the spring 204 is considerably weaker than the spring 208.

When the piston rod 174 returns to its initial position as shown in Fig. 7, the inlet port 192 is uncovered and the portion of the axial bore 172 in front of the piston is recharged by lubricant flowing under pressure out of the hose 120 through the inlet port into the axial bore. The check valve spring 190 is sufficiently strong to hold the check valve ball 188 seated over the outer end of the axial bore 172 against the force due to the priming or recharging lubricant pressure. The priming lubricant pressure may be about 200 p. s. i., for example. The pressure developed by the forward movement of the piston 174 is much greater than this.

The priming pressure for recharging the lubricant gun 52 is provided by the lubricant source 114. Compressed air is supplied to the portion of the tank 220 above the piston 230 through the inlet 247, the pressure regulating valve 246, the conduit 244, and the inlet opening 228 in the cover 226 of the tank. The piston 230 applies the pressure of the compressed air to the lubricant 232 in the tank below the piston. The leather cups 234 and 236 prevent leakage of compressed air and lubricant around the piston 230. Lubricant under the priming pressure is transmitted from the source 114 of lubricant to the gun 52 through the outlet opening 251 in the base 222 of the tank, the hose 116, the passage 122 in the connecting block 118, and the hose 120.

When all of the conveyor wheels have been lubricated, the line switch 126 is opened to discontinue supplying power to the latch releasing solenoid 110 and the circuit including the solenoid 62. The switch 126 may be operated manually or by a timer. The torsional spring 105 then rotates the latch 102 counterclockwise to the dotted line position as shown in Fig. 2. This movement of the latch raises the plunger 108 and the armature 112 of the solenoid. After the roller 66 passes over the next wheel 12, the arm 44 falls back until the pin 90 engages the sloping front end 106 of the latch 102. The arm 44 is arrested in this position. In this position the switch operating dog 76 is above and beyond the head 278 of the switch operating plunger 78. Succeeding wheels 12 slide under the roller 66 without operating the switch 80. After each of the wheels passes under the roller 66, the arm 44 falls back until the pin 90 engages the latch 102.

It will be understood that a second lubricator is provided to lubricate the right-hand wheel bearing 20 seen in Fig. 1. A roller 306 forming a part of the second lubricator is shown. This roller corresponds with the roller 66. Both the left-hand and the right-hand lubricators may utilize the same lubricant pressure source 114. The additional lubricator uses the lubricant outlet 224. Both of the lubricators may be controlled by the same line switch 126.

The lubricator is provided with a number of adjustments to accommodate various types of trolley conveyors. The slots 36 and 40 provide for lateral adjustment of the frame casting 30 on the I-beam section 10. The roller 66 may be extended and retracted on the arm 44 by adjusting the nut 72 on the threaded roller carrying rod 68. Thus the roller may be properly positioned with respect to the wheels 12. The clearance between the nozzle 170 and the lubricating fittings 24 is adjustable by means of the slots 36 and 40.

The lubricant gun 52 may be aligned vertically with the lubricating fittings 24 by shifting the bushing 140 in the oversize hole 142 in the arm 44. This adjustment is facilitated by the threaded stop 150. A limited adjustment of the horizontal alignment between the gun 52 and the lubricating fittings 24 may also be made by shifting the bushing 140 in the oversized opening 142. This adjustment is facilitated by the threaded stop 151. The spacing between the roller 66 and the lubricating gun 52 may be adjusted by shifting the roller supporting rod 68 in the slot 70. The threaded stop 74 facilitates this adjustment. The initial position of the piston rod 174 may be adjusted by screwing the piston rod through the spring carrier 200. Shifting the initial position of the piston rod provides an adjustment of the quantity of lubricant ejected by each individual operation of the lubricating gun.

Spacers 38 and 42 having different thicknesses may be provided to accommodate sizes of trolley wheels and trolleys which do not come within the range of the adjustment provided by the oversize opening 142 in the arm 44. For large size trolleys the spacers may be omitted.

The stroke of the switch operating plunger 78 is adjustable by shifting the nuts 280 and 282 on the plunger. The slots 89 in the switch mounting plate 87 provide an adjustment of the position of the switch 80.

The lubricator is capable of lubricating trolley wheels in rapid succession. The solenoid 62 operates the lubricating gun 52 very quickly. The torsional spring 84 returns the arm 44 to its initial position very rapidly after the roller 66 passes over the trolley wheels 12. Consequently the lubricator is ready to lubricate another wheel very soon after a previous wheel has been lubricated.

The automatic latching arrangement prevents unnecessary wear on the lubricator during the time the lubricator is not operating. The latching arrangement is very convenient since the latch is automatically released when the main power line switch is closed to start the lubricator, and the arm 44 is automatically latched when the line switch is opened to stop the operation of the lubricator.

Many of the details of the embodiment described herein are merely illustrative and should not be taken as limitative. The invention may be practiced by many equivalent arrangements. The scope of the invention is indicated by the following claims.

We claim:

1. A machine for lubricating conveyor wheels while they are in motion along a track, comprising an arm, pivot means supporting the arm, the pivot means being oriented approximately at right angles to the track and being positioned on one side of the track, a lubricating gun carried by the arm, nozzle means on the gun movable into lubricating engagement with the wheels, a back stop initially positioning the arm longitudinally to the track, a wheel rider positioned on the arm for engagement by the individual wheels as they come into general alignment with the gun to carry the arm away from the stop along with the wheels and eventually to move the rider out of the path of the wheels, means to move the nozzle into lubricating engagement with the wheels after they engage the wheel rider, and means to return the arm to the back stop after the individual wheels move the rider aside.

2. A machine for lubricating trolley conveyor wheels while they are in motion, comprising a lubricating gun, an arm supporting the gun for lateral rocking movement in general alignment with the wheels, a wheel rider positioned on the arm for engaging the individual wheels as they move into alignment with the gun to move the gun laterally forward along with the wheels, motive means to move the gun into lubricating engagement with the wheels, means to energize the motive means during initial forward movement of the gun, and pivot means supporting the arm positioned to provide for movement of the rider around the wheels after further forward movement of the arm to release the arm to condition the machine for lubricating succeeding wheels.

3. A machine for lubricating wheels while they are in motion along a generally horizontal track, comprising a downwardly extending arm, pivot means rotatably supporting the arm at its upper end, a lubricating gun supported by the arm at its lower end in a position generally parallel with the pivot means and in general alignment with a portion of the path of the wheels, nozzle means located forwardly on the gun movable forwardly into lubricating engagement with the wheels, a wheel rider positioned on the arm to engage the leading portions of the individual wheels when they move into general alignment with the gun to carry the arm forward with the wheels, the rider eventually being pushed aside by the wheels to release the arm to condition the machine for lubricating succeeding wheels, and means to move the nozzle means into lubricating engagement with the wheels during initial forward movement of the gun.

4. A machine for lubricating conveyor wheels while they are in motion, comprising a lubricating gun, supporting means carrying the gun for back and forth movement in a path in general alignment with a portion of the path of the wheels, a wheel follower carried by the supporting means for back and forth movement into and out of the path of the wheels for engagement by the individual wheels to move the gun forward along with the wheels when one of them comes into alignment with the gun, means operable during initial forward movement of the gun to energize the gun for lubricating the individual wheels, means to return the wheel follower into the path of the next wheel after the follower has been moved out of the path of the preceding wheel, latching means having a pair of relatively movable interengageable parts, one of the parts being stationary and the other being carried by the supporting means, the latching means being positioned to arrest the supporting means before the wheel follower fully returns into the path of the wheels, and means to release the latching means.

5. A machine for lubricating trolley conveyor wheels while they are in motion, comprising a lubricating gun, supporting means carrying the gun for back and forth movement in a path in general alignment with a portion of the path of the wheels, a wheel follower carried by the supporting means for back and forth movement into and out of the path of the wheels for engagement by the individual wheels to move the gun forward along with the wheels when one of them comes into alignment with the gun, means operable during initial forward movement of the gun to energize the gun for lubricating the individual wheels, means to return the wheel follower into the path of the next wheel after the follower has been moved out of the path of the preceding wheel, latching means having a pair of relatively movable interengageable parts consisting of a stop and a pawl movable into engagement with the stop, one of the parts being stationary and the other being carried by the supporting means, the latching being positioned to arrest the supporting means near the beginning of its return movement into the path of the wheels, and means for moving the pawl to release the latching means.

6. A machine for lubricating wheels while they are in motion along a track, comprising an arm, pivot means supporting the arm, the pivot means being oriented approximately at right angles to the track and being positioned on one side of the track, a lubricating gun carried by the arm, nozzle means on the gun movable into lubricating engagement with the wheels, a back stop initially positioning the arm transversely to the track, a wheel rider positioned on the arm for engagement by the individual wheels as they come into general alignment with the gun to carry the arm away from the stop along with the wheels, the wheels eventually pushing the rider aside to release the arm, means to move the nozzle into lubricating engagement with the wheels after they engage the wheel rider, means to return the arm to the back stop after the individual wheels move around the rider, latching means having a pair of relatively movable interengageable parts, one of the parts being stationary and the other being carried by the arm, the latching means being positioned to arrest the arm before it fully returns to the back stop, and means to release the latching means.

7. A machine for lubricating conveyor wheels while they are in motion along a track, comprising an arm, pivot means supporting the arm, the pivot means being oriented approximately at right angles to the track and being positioned on one side of the track, a lubricating gun carried by the arm, nozzle means on the gun movable into lubricating engagement with the wheels, a back stop initially positioning the arm longitudinally to the track, a wheel rider carried by the arm for engagement by the individual wheels as they come into general alignment with the gun to carry the arm away from the stop along with the wheels and eventually to move the rider out of the path of the wheels, power operated means to move the nozzle means into lubricating engagement with the wheels, power controlling means for controlling the energization of the power operated means, the power controlling means including a first part carried by the arm and a second part having a stationary mounting to position the second part in the path of the first part, one of the parts being movable by the other to energize the power operated means, and means to return the arm to the back stop after the individual wheels push the rider aside.

8. A machine for lubricating conveyor wheels while they are in motion, comprising a lubricating gun, supporting means carrying the gun for back and forth lateral movement in general alignment with a portion of the path of the wheels, means operable by the individual wheels to move the gun forward laterally along with the wheels when one of them comes into alignment with the gun, power operated means to operate the gun for lubricating the wheels, power controlling means for controlling the energization of the power operated means, the power controlling means including a first part carried by the supporting means and a second part having a stationary mounting to position the second part in the path of the first part, one of the parts including a pawl, one of the parts being movable by the other to energize the power operated means during initial forward movement of the supporting means, the pawl ratcheting over the other part during return movement of the supporting means, and means to return the gun backward laterally after lubricating the individual wheels to condition the machine for lubricating succeeding wheels.

9. A machine for lubricating conveyor wheels while they are in motion, comprising a lubricating gun, supporting means carrying the gun for back and forth lateral movement in general alignment with a portion of the path of the wheels, means operable by the individual wheels to move the gun forward laterally along with the wheels when one of them comes into alignment with the gun, a solenoid to operate the gun for lubricating the wheels, switching means for controlling the energization of the solenoid, the switching means including a first part carried by the supporting means and a second part having a stationary mounting to position the second part in the path of the first part, one of the parts being movable by the other to energize the solenoid, and means to return the gun backward laterally after lubricating the individual wheels to condition the machine for lubricating succeeding wheels.

10. A machine for lubricating conveyor wheels while they are in motion, comprising a lubricating gun, supporting means carrying the gun for back and forth lateral movement in general alignment with a portion of the path of the wheels, means operable by the individual wheels to move the gun forward laterally along with the wheels when one of them comes into alignment with the gun, a solenoid to operate the gun for lubricating the wheels, switching means for controlling the energization of the solenoid, the switching means including a pawl carried by the supporting means and a switch operating plunger having a stationary mounting to position the plunger in the path of the pawl, the plunger being movable by the pawl to energize the power operated means during initial forward movement of the gun, and means to return the gun backward laterally after lubricating the individual wheels to condition the machine for lubricating succeeding wheels, the pawl ratcheting over the plunger during return movement of the gun.

11. A machine for lubricating wheels while they are in motion along a track, comprising an arm, pivot means rotatably supporting the arm at one end for rotation in a plane generally parallel to the track, a lubricating gun supported by the arm at its lower end in a position generally parallel with the pivot means and in general alignment with a portion of the path of the wheels, nozzle means located forwardly on the gun and movable forwardly into lubricating engagement with the wheels, operating means located rearwardly on the gun and movable forwardly to move the nozzle means, a thrust member slidable through the pivot means, a rocker pivoted on the arm having one end engageable with the operating means and an opposite end engageable with the thrust member, power operated means to push the thrust member against the rocker to operate the gun, a wheel rider positioned on the arm for engagement by the individual wheels when they move into general alignment with the gun to carry the arm forward with the wheels, power controlling means for controlling the energization of the power operated means, the power controlling means including a first part carried by the arm and a second part having a stationary mounting to position the second part in the path of the first part, one of the parts being movable by the other to energize the power operated means during initial movement of the arm, and means to return the arm backward after the individual wheels pass the wheel rider.

12. A machine for lubricating wheels while they are in motion along a generally horizontal track, comprising a downwardly extending arm, pivot means rotatably supporting the arm at its upper end, a lubricating gun supported by the arm at its lower end in a position generally parallel with the pivot means and in general alignment with a portion of the path of the wheels, nozzle means located forwardly on the gun movable forwardly into lubricating engagement with the wheels, operating means located rearwardly on the gun and movable forwardly to move the nozzle means, a thrust member slidable through the pivot means, a rocker pivoted on the arm having one end engageable with the operating means and an opposite end engageable with the thrust member, a solenoid to push the thrust member against the rocker to operate the gun, a wheel rider positioned on the arm to engage the leading portion of the individual wheels when they move into general alignment with the gun to carry the arm forward with the wheels, a pawl on the arm, a switch having an operating plunger in the path of the pawl, and circuit means interconnecting the solenoid and the switch to energize the solenoid when the switch is operated.

13. A machine for lubricating conveyor wheels while they are in motion along a track, comprising an arm, pivot means supporting the arm at one end for rotation in a plane generally parallel with the track, a lubricating gun including means carried by the arm forming a cylindrical opening generally parallel with the pivot means and in general alignment with a portion of the path of the wheels, a sleeve reciprocable forwardly in the opening toward the wheels, an internal shoulder located forwardly in the opening, a compression spring positioned between the sleeve and the shoulder to urge the sleeve rearwardly, a member reciprocable in the sleeve having a nozzle at its forward end for delivering lubricant to the wheels, a rear internal shoulder located rearwardly in the sleeve, a front internal shoulder located forwardly in the sleeve, an external shoulder located rearwardly on the member and engageable with the front shoulder on the sleeve, a compression spring positioned between the member and the rear shoulder on the sleeve to urge the external shoulder on the member against the front internal shoulder on the sleeve, an axial bore extending through the member, a piston reciprocable in the bore protruding rearwardly from the member, a piston operating compression spring positioned between the rear shoulder on the sleeve and the piston for moving the piston forwardly, a piston return compression spring positioned between the piston and the member to urge the piston rearwardly, an inlet opening for lubricant communicating with the bore between the piston and the nozzle, a thrust member slidable through the pivot means, a rocker pivoted on the arm having one end engageable with the rear end of the sleeve on the gun and an opposite end engageable with the thrust member, power operated means to push the thrust member against the rocker to move the sleeve forward for operating the gun, a wheel rider positioned on the arm for engagement by the individual wheels when they move into general alignment with the gun to carry the arm forward with the wheels, power controlling means for controlling the energization of the power operated means, the power controlling means including a first part carried by the arm and a second part having a stationary mounting to position the second part in the path of the first part, one of the parts being movable by the other to energize the power operated means during initial movement of the arm, and means to return the arm backward after the individual wheels pass the wheel rider.

14. A machine for lubricating conveyor wheels while they are in motion, comprising a lubricating gun, supporting means carrying the gun for back and forth movement in a path in general alignment with a portion of the path of the wheels, a wheel follower carried by the supporting means for back and forth movement into and out of the path of the wheels for engagement by the individual wheels to move the gun forward along with the wheels when one of them comes into alignment with the gun, first power operated means operative during initial forward movement of the gun to energize the gun for lubricating the individual wheels, means to return the wheel follower into the path of the next wheel after the follower has been moved out of the path of the preceding wheel, latching means having a pair of relatively movable interengageable parts, one of the parts being stationary and the other being carried by the supporting means, the latching means being positioned to arrest the supporting means before the wheel follower fully returns into the path of the wheels, second power operated means to release the latching means, and power controlling means for simultaneously controlling the energization of the first and second power operated means.

15. A machine for lubricating wheels while they are in motion, comprising a lubricating gun, supporting means carrying the gun for back and forth movement in a path in general alignment with a portion of the path of the wheels, a wheel follower carried by the supporting means for back and forth movement into and out of the path of the wheels for engagement by the individual wheels to move the gun forward along with the wheels when one of them comes into alignment with the gun, first power operated means to operate the gun for lubricating the wheels, the power operated means including control means for operating the gun during initial forward movement of the gun, the control means including a first part carried by the supporting means and a second relatively movable part having a stationary mounting to position the second part in the path of the first part, one of the parts being movable by the other to energize the power operated means, means to return the wheel follower into the path of the next wheel after the follower has been moved out of the path of the preceding wheel, latching means having a pair of relatively movable interengageable parts, one of the parts being stationary and the other being carried by the supporting means, the latching means being positioned to arrest the supporting means before the wheel follower fully returns into the path of the wheels, power operated means to release the latching means, and power controlling means for simultaneously controlling the energization of the first and second power operated means.

16. A machine for lubricating conveyor wheels while they are in motion, comprising a lubricating gun, supporting means carrying the gun for back and forth movement in a path in general alignment with a portion of the path of the wheels, a wheel follower carried by the supporting means for back and forth movement into and out of the path of the wheels for engagement by the individual wheels to move the gun forward along with the wheels when one of them comes into alignment with the gun, power operated means to operate the gun for lubricating the wheels, power controlling means controlling the energization of the power operated means, the power controlling means including a first part carried by the supporting means and a second relatively movable part having a stationary mounting to position the second part in the path of the first part, one of the parts including a pawl, one of the parts being movable by the other to energize the power operated means during initial forward movement of the gun, means to return the wheel follower into the path of the next wheel after the follower has been moved out of the path of the preceding wheel, the pawl ratcheting over the other part during return movement of the follower, latching means having a pair of relatively movable interengageable parts, one of the parts being stationary and the other being carried by the supporting means, the latching means being positioned to arrest the supporting means before the pawl ratchets over said other part, and means to release the latching means.

17. A machine for lubricating wheels while they are in motion, comprising a lubricating gun, supporting means carrying the gun for back and forth movement in a path in general alignment with a portion of the path of the wheels, a wheel follower carried by the supporting means for back and forth movement into and out of the path of the wheels for engagement by the individual wheels to move the gun forward along with the wheels when one of them comes itno alignment with the gun, power operated means to operate the gun for lubricating the wheels, power controlling means controlling the energization of the power operated means, the power controlling means including a first part carried by the supporting means and a second relatively movable part having a stationary mounting to position the second part in the path of the first part, the parts being positioned to pass each other during initial forward movement of the gun, one of the parts being movable by the other during passing to energize the power operated means, means to return the wheel follower into the path of the next wheel after the follower has been moved out of the path of the preceding wheel, latching means having a pair of relatively movable interengageable parts, one of the parts being stationary and the other being carried by the supporting means, the latching means being positioned to arrest the supporting means before the power controlling parts pass each other during return movement of the wheel follower, and means to release the latching means.

18. Lubricating apparatus for charging lubricant into lubricant fittings on moving machine structure such as a conveyor, comprising, in combination, lubricating means including a lubricant discharging nozzle, means supporting said nozzle adjacent the machine structure for movement along a portion of its path of movement, said nozzle supporting means and said nozzle having a starting position, rider means connected to said nozzle supporting structure and positioned when the latter is in said starting position to positively engage a portion of said movable structure to carry said nozzle along with the latter in alignment with a lubricant fitting thereon, means operable to advance said nozzle into engagement with the lubricant fitting while moving in alignment therewith, means to expel lubricant from said nozzle into the fitting, and means operable to disengage said rider from the movable structure after movement therewith through a predetermined distance, said nozzle and said supporting structure therefor being returnable to said starting position.

19. Apparatus for charging lubricant into lubricant receiving means on the movable structure of a machine such as a conveyor, comprising, in combination, lubricating means including a lubricant discharge nozzle, movable means supporting said nozzle for movement alongside a portion of the path of the lubricant receiving means for the machine structure, said nozzle and said supporting means therefor having a starting position, rider means on said nozzle supporting structure positioned when the latter is in said starting position to positively engage said movable machine structure to carry the nozzle along with the latter in alignment with lubricant receiving means thereon, means for advancing said nozzle into engagement with the lubricant receiving means while moving in alignment therewith, flexible means providing for radial movement of said nozzle on said supporting means therefor to follow without strain the movement of the lubricant receiving means, means to expel lubricant from said nozzle into the lubricant receiving means, and means operable to disengage said rider from said movable machine structure after movement therewith through a predetermined distance.

20. Lubricating apparatus for charging lubricant into lubricant fittings on movable machine structure, comprising, in combination, lubricating means including a lubricant discharge nozzle, means including a swingable arm supporting said nozzle for movement along a portion of the path of movement of the lubricant fittings, said arm and said nozzle thereon having a starting position, a rider connected to said arm and located when the latter is in said starting position to positively engage said movable structure to carry said nozzle along with the latter in alignment with a lubricant fitting thereon, means for advancing said nozzle into engagement with the lubricant fitting while moving in alignment therewith, and means to expel lubricant from said nozzle into the lubricant fitting, said rider being disengaged from said moving machine structure by said arm after movement therewith through a predetermined distance.

21. Apparatus for charging lubricant into a lubricant fitting on moving structure of a machine, comprising, in combination, lubricating means including a lubricant discharge nozzle, a swingable arm supporting said nozzle for movement alongside the path of movement of the fitting, said nozzle and said support arm therefor having a starting position, a rider mounted on said arm and positioned when the latter is in said starting position to positively engage the movable machine structure to carry said nozzle along with the latter in alignment with the fitting thereon, means for advancing said nozzle into engagement with the fitting while moving in alignment therewith, flexible means supporting said nozzle on said arm to allow the nozzle to move radially in following the movement of the lubricant fitting coupled thereto, means for expelling lubricant from said nozzle into the fitting, said support arm serving to disengage said rider from the moving machine structure after movement therewith through a predetermined distance, and adjusting means for shifting the position of said nozzle on said support arm and adjusting means for shifting the position of said rider on said support arm to adapt the apparatus for use with machine structures of different size.

References Cited in the file of this patent

UNITED STATES PATENTS

| Number | Name | Date |
|---|---|---|
| 1,125,750 | Smith | Jan. 19, 1915 |
| 2,016,405 | Watson | Oct. 8, 1935 |
| 2,030,533 | Pate | Feb. 11, 1936 |
| 2,502,659 | Livingston | Apr. 4, 1950 |
| 2,574,744 | Koepke | Nov. 13, 1951 |

FOREIGN PATENTS

| Number | Country | Date |
|---|---|---|
| 440,518 | Great Britain | Jan. 1, 1936 |